US011554769B2

United States Patent
Yonezawa et al.

(10) Patent No.: US 11,554,769 B2
(45) Date of Patent: Jan. 17, 2023

(54) HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 16/828,278

(22) Filed: Mar. 24, 2020

(65) Prior Publication Data
US 2020/0317186 A1    Oct. 8, 2020

(30) Foreign Application Priority Data

Apr. 4, 2019    (JP) .............................. JP2019-071771

(51) Int. Cl.
*B60W 20/10*    (2016.01)
*B60W 10/08*    (2006.01)
(Continued)

(52) U.S. Cl.
CPC ............ *B60W 20/10* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 2050/0026; B60W 2510/0638;
(Continued)

(56) References Cited

U.S. PATENT DOCUMENTS

| 2016/0201769 A1* | 7/2016 | Scholle | F16D 21/02 |
| | | | 475/5 |
| 2018/0178776 A1* | 6/2018 | Kuwahara | B60W 20/30 |
| 2018/0281580 A1* | 10/2018 | Heldmann | F16H 3/725 |

FOREIGN PATENT DOCUMENTS

| JP | 2013189066 A | * | 9/2013 |
| JP | 2015-058924 A | | 3/2015 |

(Continued)

OTHER PUBLICATIONS

Smith "Cubic Inches, Boost, or RPM? Where does Horsepower Really Come From?"; Jul. 21, 2014; MotorTrend; pp. 9-10 (Year: 2014).*

*Primary Examiner* — Jonathan M Dager
*Assistant Examiner* — Jean W Charleston
(74) *Attorney, Agent, or Firm* — Sughrue Mion, PLLC (57) ABSTRACT

A vehicle includes an engine, a first MG, a planetary gear mechanism, a battery that stores power generated by the first MG and supplies the stored power to the first MG, and an HV-ECU that controls the engine and the first MG. The engine includes a turbo. A boost line is determined on a map representing a relationship between the rotation speed of the engine and torque generated by the engine, and the turbo boosts suctioned air when torque generated by the engine, as indicated by an operating point on the map, exceeds the boost line. The HV-ECU controls the engine and the first MG so that when the allowable value Wout of power output from the battery is small, the operating point exceeds the boost line at a higher rotation speed than when the allowable value Wout is large.

5 Claims, 9 Drawing Sheets

(51) Int. Cl.
    *B60W 10/06*     (2006.01)
    *B60W 50/00*     (2006.01)

(52) U.S. Cl.
    CPC ............... *B60W 2050/0026* (2013.01); *B60W 2510/0638* (2013.01); *B60W 2510/0657* (2013.01); *B60W 2510/242* (2013.01); *B60W 2710/0644* (2013.01)

(58) Field of Classification Search
    CPC ... B60W 2510/0657; B60W 2510/242; B60W 2710/0644; B60W 20/13; B60W 30/1882; B60W 20/15; B60W 2510/244; B60W 2710/0666; B60W 2710/081; Y02T 10/62; B60K 6/445; F02B 37/12; F02D 29/02; F02D 31/001; F02D 2250/18
    USPC .......................................................... 701/22
    See application file for complete search history.

(56) References Cited

FOREIGN PATENT DOCUMENTS

| | | | |
|---|---|---|---|
| JP | 2015058924 A | * | 3/2015 |
| JP | 2015-131535 A | | 7/2015 |
| JP | 2016-016695 A | | 2/2016 |

\* cited by examiner

HYBRID VEHICLE

This nonprovisional application is based on Japanese Patent Application No. 2019-071771 filed with the Japan Patent Office on Apr. 4, 2019, the entire contents of which are hereby incorporated by reference.

BACKGROUND

Field

The present disclosure relates to a hybrid vehicle, and more specifically to a hybrid vehicle including an internal combustion engine with a forced induction device.

Description of the Background Art

Japanese Patent Laying-Open No. 2015-058924 discloses a hybrid vehicle having mounted therein an internal combustion engine equipped with a turbo forced induction device, and a motor generator.

SUMMARY

In hybrid vehicle disclosed in Japanese Patent Laying-Open No. 2015-58924, a delay of a response of torque generated by the internal combustion engine due to a delay of a response of boost pressure of the forced induction device can be compensated for by torque generated by the motor generator. However, when the allowable value of the power output from the power storage device is limited to a small value, the motor generator, which is driven by the power of the power storage device, may not be able to generate sufficient torque to compensate for the delay of the response of the torque generated by the internal combustion engine.

The present disclosure has been made in order to solve the above problem, and an object thereof is to provide a hybrid vehicle comprising an internal combustion engine equipped with a forced induction device, that can reduce a delay of a response of torque generated when the allowable value of the power output from the power storage device is limited to a small value.

A hybrid vehicle according to the present disclosure comprises: an internal combustion engine; a rotating electric machine; a planetary gear mechanism to which the internal combustion engine, the rotating electric machine and an output shaft are connected; a power storage device that stores power generated by the rotating electric machine and supplies the stored power to the rotating electric machine; and a controller that controls the internal combustion engine and the rotating electric machine. The internal combustion engine includes a forced induction device that boosts suctioned air to be fed to the internal combustion engine. A boost line is determined on a map representing a relationship between a rotation speed of the internal combustion engine and torque generated by the internal combustion engine, and the forced induction device boosts suctioned air when the torque generated by the internal combustion engine indicated by an operating point on the map exceeds the boost line. The controller controls the internal combustion engine and the rotating electric machine so that when an allowable value of power output from the power storage device is small, the operating point exceeds the boost line at a higher rotation speed than when the allowable value is large.

According to this configuration, when the allowable value of power output from the power storage device is small, the operating point exceeds the boost line at higher rotation speed than when the allowable value is large, which can increase exhaust gas energy supplied to the forced induction device when boosting suctioned air is started. This can reduce a delay of a response of boost pressure by the forced induction device. As a result, the vehicle including the internal combustion engine with the forced induction device can be provided such that when the allowable value of power output from the power storage device is limited to a small value and torque supplemented by the rotating electric machine is decreased, a delay of a response of torque generated by the internal combustion engine, and hence a delay of a response of torque generated by the internal combustion engine and the rotating electric machine together can be reduced.

Preferably, the controller controls the internal combustion engine and the rotating electric machine so that when the allowable value of power output from the power storage device is small, the operating point moves along an operation line corresponding to a higher rotation speed with respect to torque generated, as represented on the map, than when the allowable value is large.

This configuration allows the vehicle including the internal combustion engine equipped with the forced induction device to reduce a delay of a response of torque generated when the allowable value of power output from the power storage device is limited to a small value.

Still preferably, an operation line corresponding to the allowable value is predetermined. This configuration allows more efficient control than when no operation line corresponding to the allowable value is previously determined.

Preferably, the controller increases the rotation speed of the internal combustion engine by controlling the rotating electric machine to increase a rotation speed of the rotating electric machine. This configuration allows the rotation speed of the internal combustion engine to be increased with precision.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present disclosure will be described in detail below with reference to the drawings. The same or corresponding elements in the drawings have the same reference characters allotted and description thereof will not be repeated.

<Drive System of Hybrid Vehicle>

Figure 1:
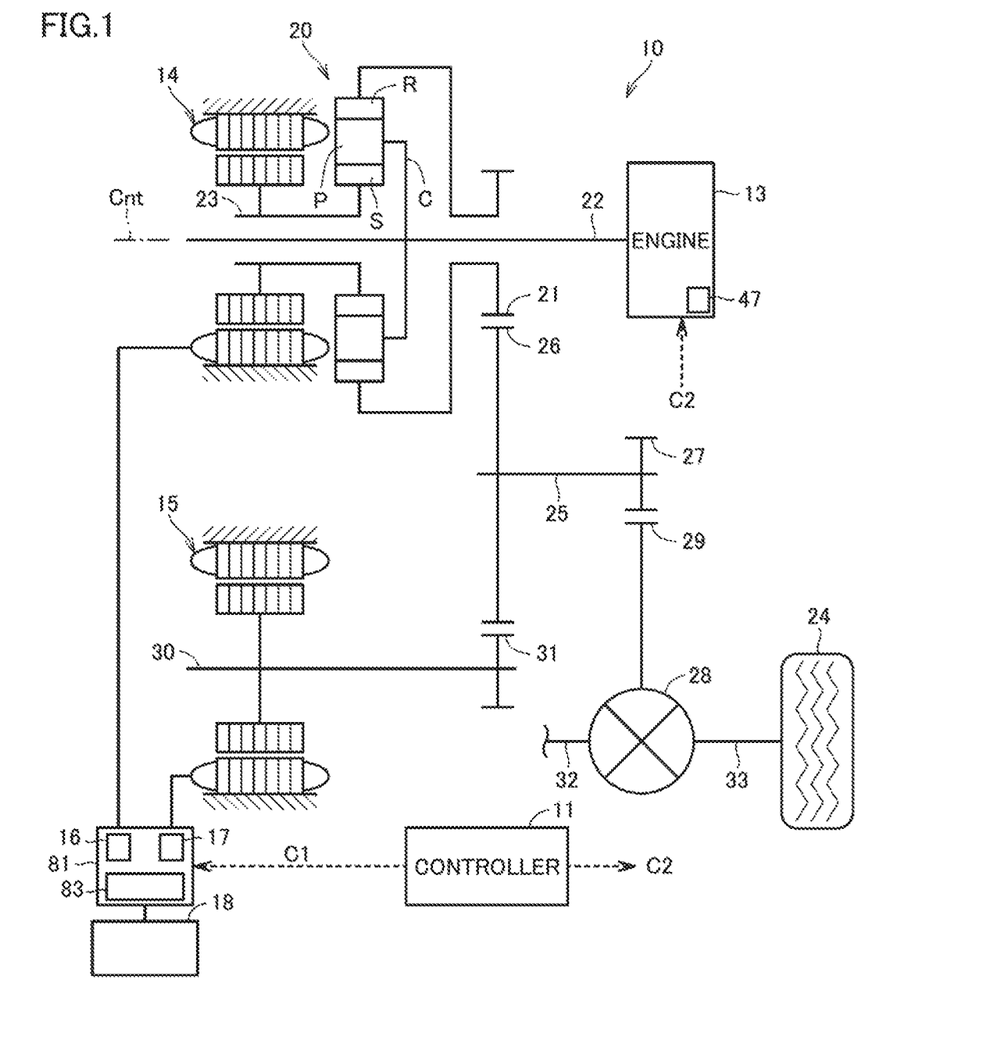
FIG. 1 is a diagram showing an exemplary configuration of a drive system of a hybrid vehicle according to an embodiment of the present disclosure.

FIG. 1 is a diagram showing an exemplary configuration of a drive system of a hybrid vehicle (which is simply denoted as a vehicle below) 10 according to an embodiment of the present disclosure. As shown in FIG. 1, vehicle 10 includes as a drive system, a controller 11 as well as an engine 13, a first motor generator (which is denoted as a first MG below) 14, and a second motor generator (which is denoted as a second MG below) 15 that serve as motive power sources for travelling. Engine 13 includes a turbocharger 47.

First MG 14 and second MG 15 each perform a function as a motor that outputs torque by being supplied with driving electric power and a function as a generator that generates electric power by being supplied with torque. An alternating current (AC) rotating electric machine is employed for first MG 14 and second MG 15. The AC rotating electric machine is, for example, a permanent magnet type or similar synchronous motor including a rotor having a permanent magnet embedded, or an induction motor.

First MG 14 and second MG 15 are electrically connected to a battery 18 with a power control unit (PCU) 81 being interposed. PCU 81 includes a first inverter 16 that supplies and receives electric power to and from first MG 14, a second inverter 17 that supplies and receives electric power to and from second MG 15, battery 18, and a converter 83 that supplies and receives electric power to and from first inverter 16 and second inverter 17.

For example, converter 83 can up-convert electric power from battery 18 and supply up-converted electric power to first inverter 16 or second inverter 17. Alternatively, converter 83 can down-convert electric power supplied from first inverter 16 or second inverter 17 and supply down-converted electric power to battery 18.

First inverter 16 can convert direct current (DC) power from converter 83 into AC power and supply AC power to first MG 14. Alternatively, first inverter 16 can convert AC power from first MG 14 into DC power and supply DC power to converter 83.

Second inverter 17 can convert DC power from converter 83 into AC power and supply AC power to second MG 15. Alternatively, second inverter 17 can convert AC power from second MG 15 into DC power and supply DC power to converter 83.

Battery 18 is a rechargeably configured electric power storage component. Battery 18 for example includes a rechargeable battery such as a lithium ion battery, a nickel metal hydride battery or the like, or a power storage element such as an electric double layer capacitor, or the like. The lithium ion secondary battery is a secondary battery in which lithium is adopted as a charge carrier, and may include not only a general lithium ion secondary battery containing a liquid electrolyte but also what is called an all-solid-state battery containing a solid electrolyte.

Battery 18 can store power generated by first MG 14 and received via first inverter 16 and can supply the stored power to second MG 15 via second inverter 17. Further, battery 18 can also store power generated by second MG 15 when the vehicle is decelerated, and received via second inverter 17, and can also supply the stored power to first MG 14 via first inverter 16 when engine 13 is started.

PCU 81 charges battery 18 with electric power generated by first MG 14 or second MG 15 or drives first MG 14 or second MG 15 with electric power from battery 18.

For battery 18, an allowable value Win is determined for power charged to battery 18 and an allowable value Wout is determined for power discharged from battery 18. Win and Wout are reduced: as a ratio of a remaining amount of charge to the full charge capacity of battery 18, or a state of charge (SOC), is reduced; the temperature of battery 18 is lower; to suppress high-rate deterioration caused as battery 18 is charged/discharged rapidly (or at a high rate); and so forth. Controller 11 controls charging/discharging so that battery 18 is neither charged with power exceeding Win nor discharges power exceeding Wout.

Engine 13 and first MG 14 are coupled to a planetary gear mechanism 20. Planetary gear mechanism 20 transmits drive torque output from engine 13 by splitting drive torque into drive torque to first MG 14 and drive torque to an output gear 21. Planetary gear mechanism 20 includes a single-pinion planetary gear mechanism and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Engine 13 has output shaft 22 coupled to carrier C. A rotor shaft 23 of first MG 14 is coupled to sun gear S. Ring gear R is coupled to output gear 21.

Carrier C to which torque output from engine 13 is transmitted serves as an input element, ring gear R that outputs torque to output gear 21 serves as an output element, and sun gear S to which rotor shaft 23 is coupled serves as a reaction force element. That is, planetary gear mechanism 20 divides an output of engine 13 for the side of first MG 14 and the side of output gear 21. First MG 14 is controlled to output torque in accordance with torque output from engine 13.

A countershaft 25 is arranged in parallel to axis Cnt. Countershaft 25 is attached to a driven gear 26 meshed with output gear 21. A drive gear 27 is attached to countershaft 25, and drive gear 27 is meshed with a ring gear 29 in a differential gear 28 representing a final reduction gear. A drive gear 31 attached to a rotor shaft 30 in second MG 15 is meshed with driven gear 26. Therefore, torque output from second MG 15 is added at driven gear 26 to torque output from output gear 21. Torque thus combined is transmitted to drive wheel 24 with driveshafts 32 and 33 extending laterally from differential gear 28 being interposed. As torque is transmitted to drive wheel 24, driving force is generated in vehicle 10.

<Configuration of Engine>

Figure 2:
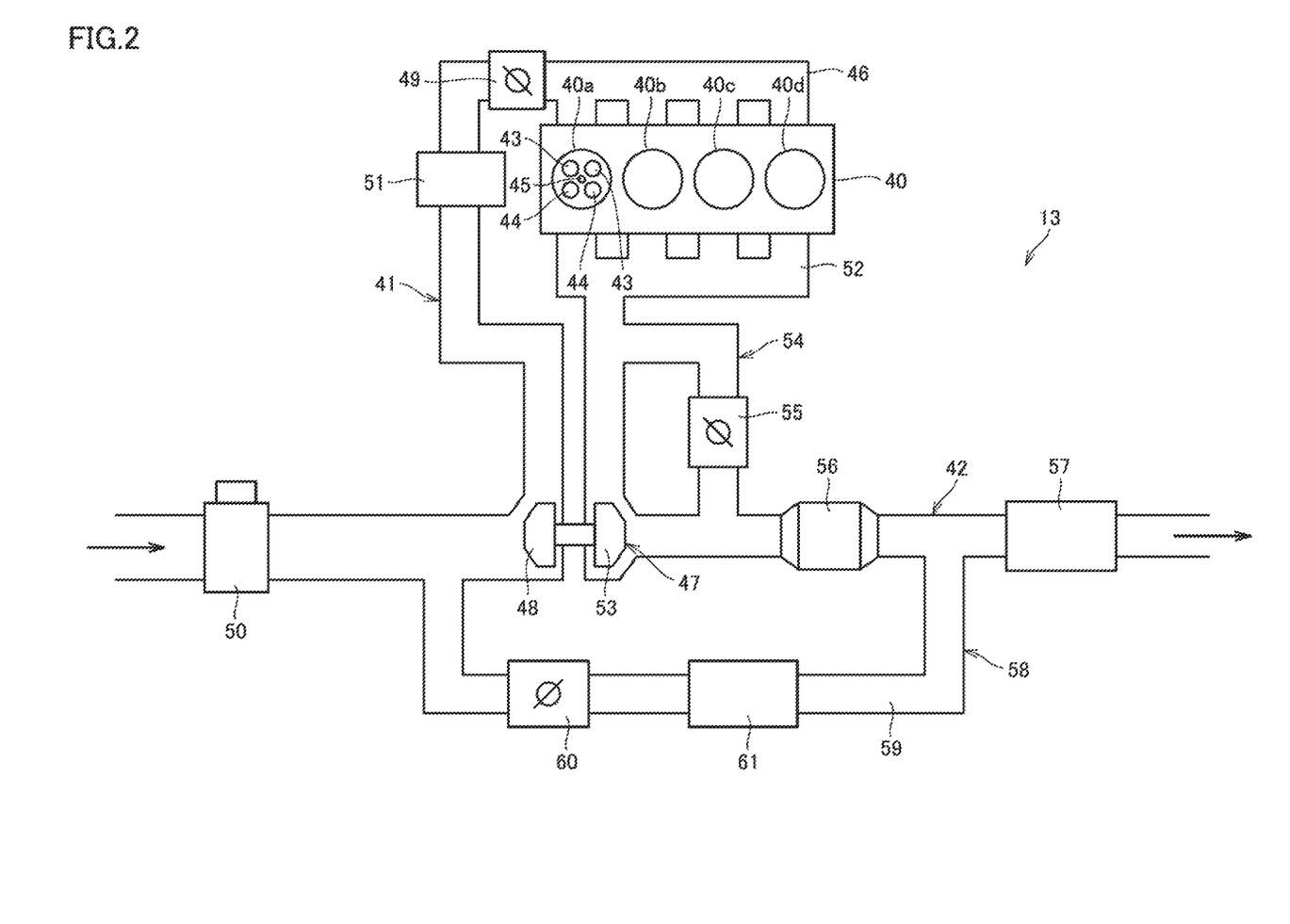
FIG. 2 is a diagram showing an exemplary configuration of an engine including a turbocharger.

FIG. 2 is a diagram showing an exemplary configuration of engine 13 including turbocharger 47. Engine 13 is, for example, an in-line four-cylinder spark ignition internal combustion engine. As shown in FIG. 2, engine 13 includes, for example, an engine main body 40 formed with four cylinders 40a, 40b, 40c, and 40d being aligned in one direction.

One ends of intake ports and one ends of exhaust ports formed in engine main body 40 are connected to cylinders 40a, 40b, 40c, and 40d. One end of the intake port is opened and closed by two intake valves 43 provided in each of cylinders 40a, 40b, 40c, and 40d, and one end of the exhaust port is opened and closed by two exhaust valves 44 provided in each of cylinders 40a, 40b, 40c and 40d. The other ends of the intake ports of cylinders 40a, 40b, 40c, and 40d are connected to an intake manifold 46. The other ends of the exhaust ports of cylinders 40a, 40b, 40c, and 40d are connected to an exhaust manifold 52.

In the present embodiment, engine 13 is, for example, a direct injection engine and fuel is injected into each of cylinders 40a, 40b, 40c, and 40d by a fuel injector (not shown) provided at the top of each cylinder. An air fuel mixture of fuel and intake air in cylinders 40a, 40b, 40c, and 40d is ignited by an ignition plug 45 provided in each of cylinders 40a, 40b, 40c, and 40d.

FIG. 2 shows intake valve 43, exhaust valve 44, and ignition plug 45 provided in cylinder 40a and does not show intake valve 43, exhaust valve 44, and ignition plug 45 provided in other cylinders 40b, 40c, and 40d.

Engine 13 is provided with turbocharger 47 that uses exhaust energy to boost suctioned air. Turbocharger 47 includes a compressor 48 and a turbine 53.

An intake air passage 41 has one end connected to intake manifold 46 and the other end connected to an air inlet. Compressor 48 is provided at a prescribed position in intake air passage 41. An air flow meter 50 that outputs a signal in accordance with a flow rate of air that flows through intake air passage 41 is provided between the other end (air inlet) of intake air passage 41 and compressor 48. An intercooler 51 that cools intake air pressurized by compressor 48 is disposed in intake air passage 41 provided downstream from compressor 48. An intake throttle valve (throttle valve) 49 that can regulate a flow rate of intake air that flows through intake air passage 41 is provided between intercooler 51 and intake manifold 46 of intake air passage 41.

An exhaust passage 42 has one end connected to exhaust manifold 52 and the other end connected to a muffler (not shown). Turbine 53 is provided at a prescribed position in exhaust passage 42. In exhaust passage 42, a bypass passage 54 that bypasses exhaust upstream from turbine 53 to a portion downstream from turbine 53 and a waste gate valve 55 provided in bypass passage 54 and capable of regulating a flow rate of exhaust guided to turbine 53 are provided. Therefore, a flow rate of exhaust that flows into turbine 53, that is, a boost pressure for suctioned air, is regulated by controlling a position of waste gate valve 55. Exhaust that passes through turbine 53 or waste gate valve 55 is purified by a start-up catalytic converter 56 and an aftertreatment apparatus 57 provided at prescribed positions in exhaust passage 42, and thereafter emitted into the atmosphere. Start-up catalytic converter 56 and aftertreatment apparatus 57 include a three-way catalyst for example.

Start-up catalytic converter 56 is provided at an upstream portion (a portion closer to the combustion chamber) of exhaust passage 42, and accordingly, it is heated to activation temperature within a short period of time after engine 13 is started. Furthermore, aftertreatment apparatus 57 located downstream purifies HC, CO and NOx that could not be purified by startup catalytic converter 56.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41. EGR valve 60 regulates a flow rate of EGR gas that flows through EGR passage 59. EGR cooler 61 cools EGR gas that flows through EGR passage 59. EGR passage 59 connects a portion of exhaust passage 42 between start-up catalytic converter 56 and aftertreatment apparatus 57 to a portion of intake air passage 41 between compressor 48 and air flow meter 50.

<Configuration of Controller>

Figure 3:
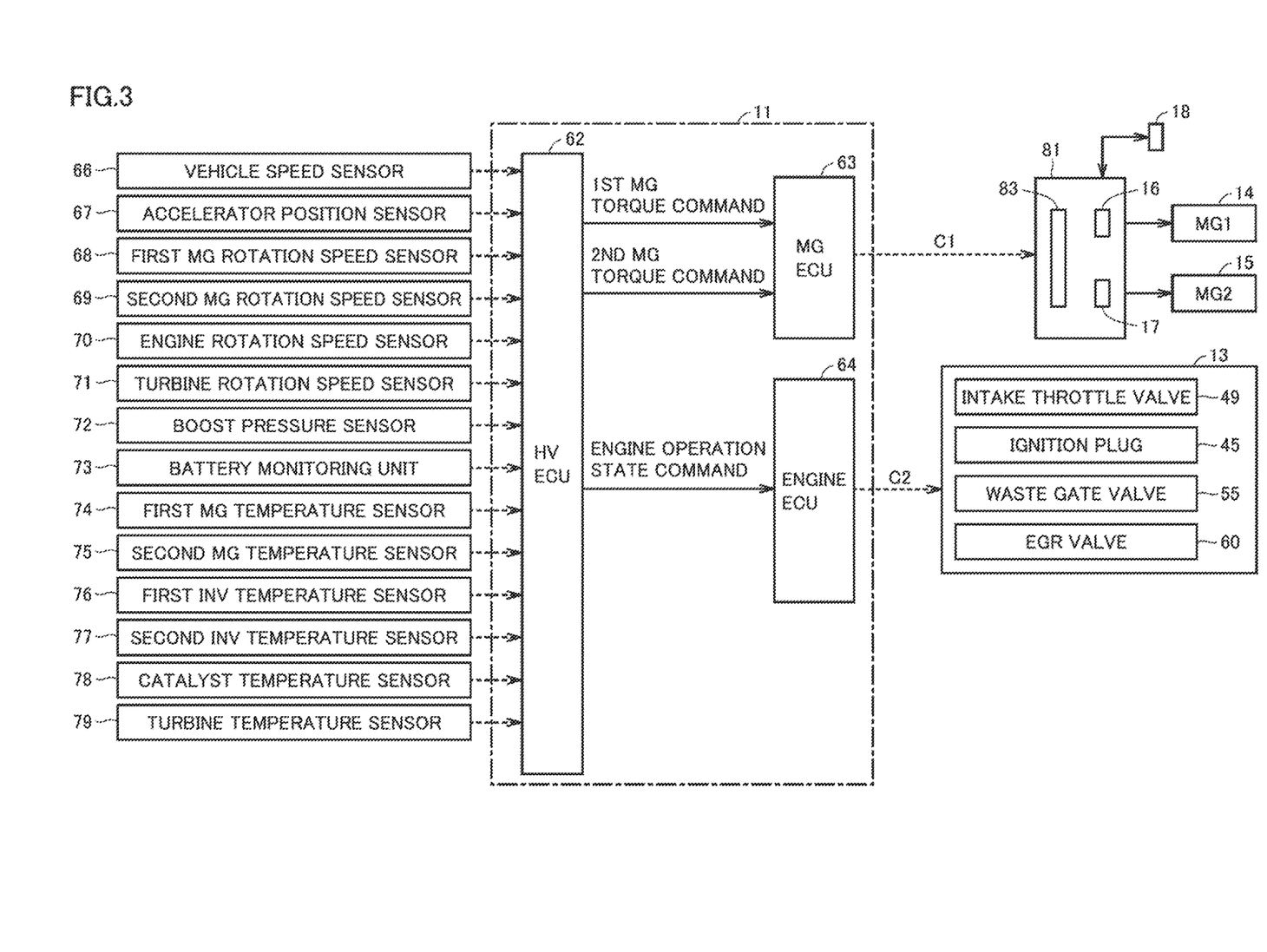
FIG. 3 is a block diagram showing an exemplary configuration of a controller.

FIG. 3 is a block diagram showing an exemplary configuration of controller 11. As shown in FIG. 3, controller 11 includes a hybrid vehicle (HV)-electronic control unit (ECU) 62, an MG-ECU 63, and an engine ECU 64.

HV-ECU 62 is a controller that controls engine 13, first MG 14, and second MG 15 in coordination. MG-ECU 63 is a controller that controls an operation by PCU 81. Engine ECU 64 is a controller that controls an operation by engine 13.

HV-ECU 62, MG-ECU 63, and engine ECU 64 each include an input and output apparatus that supplies and receives signals to and from various sensors and other ECUs that are connected, a storage that serves for storage of various control programs or maps (including a read only memory (ROM) and a random access memory (RAM)), a central processing unit (CPU) that executes a control program, and a counter that counts time.

A vehicle speed sensor 66, an accelerator position sensor 67, a first MG rotation speed sensor 68, a second MG rotation speed sensor 69, an engine rotation speed sensor 70, a turbine rotation speed sensor 71, a boost pressure sensor 72, a battery monitoring unit 73, a first MG temperature sensor 74, a second MG temperature sensor 75, a first INV temperature sensor 76, a second INV temperature sensor 77, a catalyst temperature sensor 78, a turbine temperature sensor 79 and an atmospheric pressure sensor 80 are connected to HV-ECU 62.

Vehicle speed sensor 66 detects a speed of vehicle 10 (vehicle speed). Accelerator position sensor 67 detects an amount of pressing of an accelerator pedal (accelerator position). First MG rotation speed sensor 68 detects a rotation speed of first MG 14. Second MG rotation speed sensor 69 detects a rotation speed of second MG 15. Engine rotation speed sensor 70 detects a rotation speed of output shaft 22 of engine 13 (engine rotation speed). Turbine rotation speed sensor 71 detects a rotation speed of turbine 53 of turbocharger 47. Boost pressure sensor 72 detects a boost pressure of engine 13. First MG temperature sensor 74 detects an internal temperature of first MG 14 such as a temperature associated with a coil or a magnet. Second MG temperature sensor 75 detects an internal temperature of second MG 15 such as a temperature associated with a coil or a magnet. First INV temperature sensor 76 detects a temperature of first inverter 16 such as a temperature associated with a switching element. Second INV temperature sensor 77 detects a temperature of second inverter 17 such as a temperature associated with a switching element. Catalyst temperature sensor 78 detects a temperature of aftertreatment apparatus 57. Turbine temperature sensor 79 detects a temperature of turbine 53. Various sensors output signals indicating results of detection to HV-ECU 62.

Battery monitoring unit 73 obtains an SOC of battery 18 and outputs a signal indicating the obtained SOC to HV-ECU 62. Battery monitoring unit 73 includes, for example, a sensor that detects a current, a voltage, and a temperature of battery 18. Battery monitoring unit 73 obtains an SOC by calculating the SOC based on the detected current, voltage, and temperature of battery 18. Various known approaches such as an approach by accumulation of current values (coulomb counting) or an approach by estimation of an open circuit voltage (OCV) can be adopted as a method of calculating an SOC.

<Control of Travelling of Vehicle>

Vehicle 10 configured as above can be set or switched to such a travelling mode as a hybrid (HV) travelling mode in which engine 13 and second MG 15 serve as motive power sources and an electric (EV) travelling mode in which the vehicle travels with engine 13 remaining stopped and second MG 15 being driven by electric power stored in battery 18. Setting of and switching to each mode is made by HV-ECU 62. HV-ECU 62 controls engine 13, first MG 14, and second MG 15 based on the set or switched travelling mode.

The EV travelling mode is selected, for example, in a low-load operation region where a vehicle speed is low and requested driving force is low, and refers to a travelling mode in which an operation by engine 13 is stopped and second MG 15 outputs driving force.

The HV travelling mode is selected in a high-load operation region where a vehicle speed is high and requested driving force is high, and refers to a travelling mode in which combined torque of drive torque of engine 13 and drive torque of second MG 15 is output.

In the HV travelling mode, in transmitting drive torque output from engine 13 to drive wheel 24, first MG 14 applies reaction force to planetary gear mechanism 20. Therefore, sun gear S functions as a reaction force element. In other words, in order to apply engine torque to drive wheel 24, first MG 14 is controlled to output reaction torque against engine torque. In this case, regenerative control in which first MG 14 functions as a generator can be carried out.

Control of engine 13, first MG 14, and second MG 15 in coordination while vehicle 10 operates will be described below.

HV-ECU 62 calculates requested driving force based on an accelerator position determined by an amount of pressing of the accelerator pedal. HV-ECU 62 calculates requested travelling power of vehicle 10 based on the calculated requested driving force and a vehicle speed. HV-ECU 62 calculates a value resulting from addition of requested charging and discharging power of battery 18 to requested travelling power as requested system power.

HV-ECU 62 determines whether or not activation of engine 13 has been requested in accordance with calculated requested system power. HV-ECU 62 determines that activation of engine 13 has been requested, for example, when requested system power exceeds a threshold value. When activation of engine 13 has been requested, HV-ECU 62 sets the HV travelling mode as the travelling mode. When activation of engine 13 has not been requested, HV-ECU 62 sets the EV travelling mode as the travelling mode.

When activation of engine 13 has been requested (that is, when the HV travelling mode is set), HV-ECU 62 calculates power requested of engine 13 (which is denoted as requested engine power below). For example, HV-ECU 62 calculates requested system power as requested engine power. For example, when requested system power exceeds an upper limit value of requested engine power, HV-ECU 62 calculates the upper limit value of requested engine power as requested engine power. HV-ECU 62 outputs calculated requested engine power as an engine operation state command to engine ECU 64.

Engine ECU 64 operates in response to the engine operation state command input from HV-ECU 62 to variously control each component of engine 13 such as intake throttle valve 49, ignition plug 45, waste gate valve 55, and EGR valve 60.

HV-ECU 62 sets based on calculated requested engine power, an operating point of engine 13 in a coordinate system defined by an engine rotation speed and engine torque. HV-ECU 62 sets, for example, an intersection between an equal power line equal in output to requested engine power in the coordinate system and a predetermined operating line as the operating point of engine 13.

The predetermined operating line represents a trace of variation in engine torque with variation in engine rotation speed in the coordinate system, and it is set, for example, by adapting the trace of variation in engine torque high in fuel efficiency through experiments.

HV-ECU 62 sets the engine rotation speed corresponding to the set operating point as a target engine rotation speed.

As the target engine rotation speed is set, HV-ECU 62 sets a torque command value for first MG 14 for setting a current engine rotation speed to the target engine rotation speed. HV-ECU 62 sets the torque command value for first MG 14, for example, through feedback control based on a difference between a current engine rotation speed and the target engine rotation speed.

HV-ECU 62 calculates engine torque to be transmitted to drive wheel 24 based on the set torque command value for first MG 14 and sets a torque command value for second MG 15 so as to fulfill requested driving force. HV-ECU 62 outputs set torque command values for first MG14 and second MG 15 as a first MG torque command and a second MG torque command to MG-ECU 63.

MG-ECU 63 calculates a current value corresponding to torque to be generated by first MG 14 and second MG 15 and a frequency thereof based on the first MG torque command and the second MG torque command input from HV-ECU 62, and outputs a signal including the calculated current value and the frequency thereof to PCU 81.

HV-ECU 62 may request increase in boost pressure, for example, when the accelerator position exceeds a threshold value for starting turbocharger 47, when requested engine power exceeds a threshold value, or when engine torque corresponding to the set operating point exceeds a threshold value.

Though FIG. 3 illustrates a configuration in which HV-ECU 62, MG-ECU 63, and engine ECU 64 are separately provided by way of example, the ECUs may be integrated as a single ECU.

Figure 4:
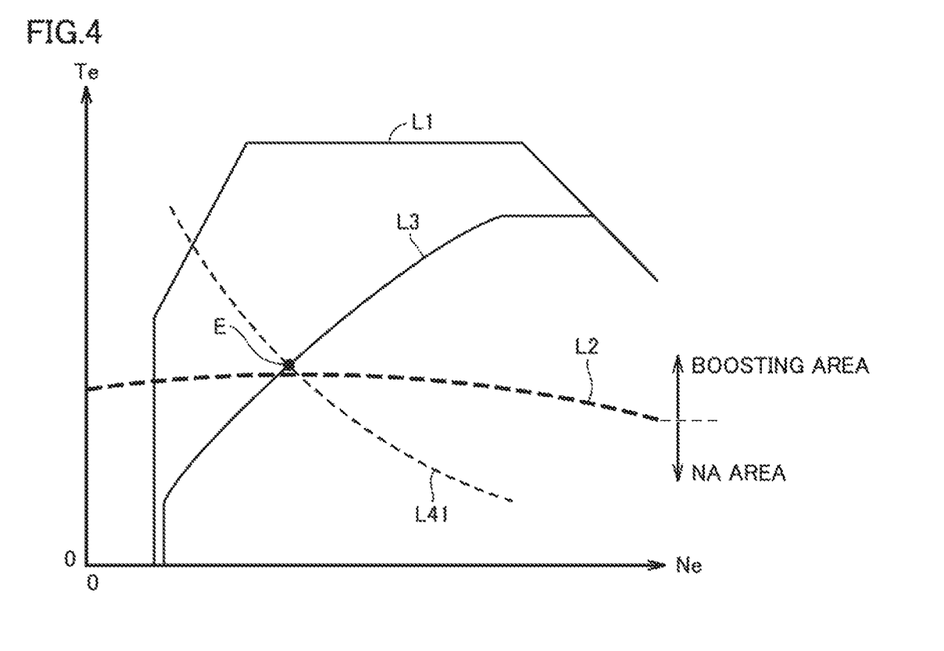
FIG. 4 is a diagram for illustrating an operating point of the engine.

FIG. 4 is a diagram for illustrating an operating point of engine 13. In FIG. 4, the vertical axis represents torque Te of engine 13, and the horizontal axis represents an engine speed Ne of engine 13.

Referring to FIG. 4, a line L1 represents a maximum torque that engine 13 can output. A dotted line L2 represents a line (a boost line) at which turbocharger 47 starts boosting. When torque Te of engine 13 exceeds boost line L2, waste gate valve 55, having been fully open, is operated in the closing direction. Adjusting the angle of opening of waste gate valve 55 can adjust the flow rate of exhaust air flowing into turbine 53 of turbocharger 47 and the boost pressure for the suctioned air can be adjusted through compressor 48. When torque Te falls below boost line L2, waste gate valve 55 can be fully opened to inactivate turbocharger 47.

In hybrid vehicle 10, engine 13 and first MG 14 can be controlled to change the operating point of engine 13. Also, the final vehicle driving force is adjustable by controlling second MG 15, and accordingly, the operating point of engine 13 can be moved while the vehicle drive force is adjusted (e.g., maintained). A way of moving the operating point of engine 13 will now be described.

Figure 5:
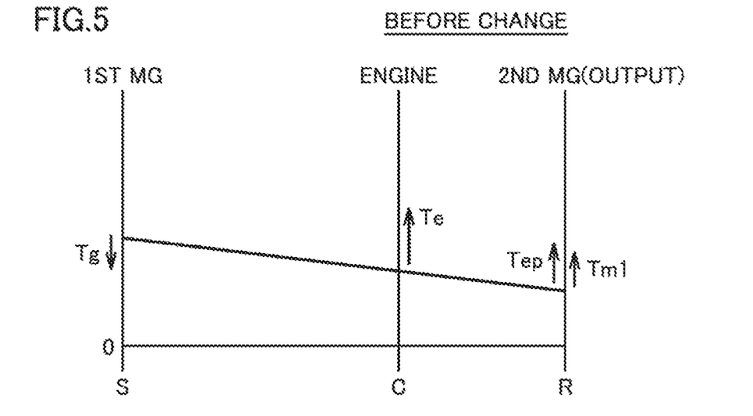
FIG. 5 is a nomographic chart representing a relationship between rotation speed and torque that the engine, a first MG, and an output element have.
Figure 6:
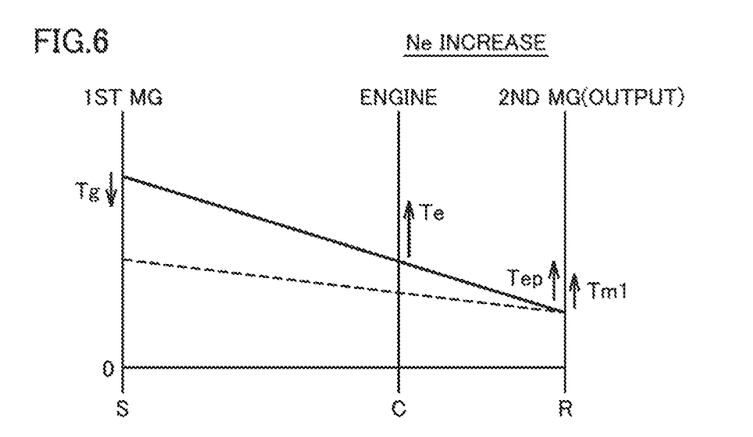
FIG. 6 is a nomographic chart representing a relationship between rotation speed and torque that the engine, the first MG, and the output element have.
Figure 7:
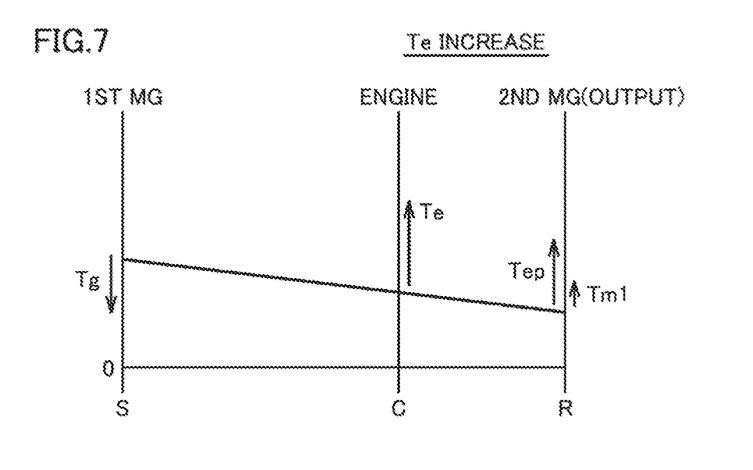
FIG. 7 is a nomographic chart representing a relationship between rotation speed and torque that the engine, the first MG, and the output element have.

FIGS. 5 to 7 are nomographic charts showing the relationship between the rotation speed and torque of engine 13, first MG 14, and the output element. FIG. 5 is a nomographic chart showing the relationship between the rotation speed and torque of the respective elements before the operating point of engine 13 is changed. FIG. 6 is a nomographic chart showing the relationship between the rotation speed and torque of the respective elements when engine speed Ne of engine 13 is increased from the state shown in FIG. 5. FIG. 7 is a nomographic chart showing the relationship between the rotation speed and torque of the respective elements when torque Te of engine 13 is increased from the state shown in FIG. 5.

In each of FIGS. 5 to 7, the output element is ring gear R coupled to countershaft 25 (FIG. 1). Positions on the vertical axis represent the rotation speeds of the respective elements (engine 13, first MG 14, and second MG 15), and spacings between the vertical axes represent the gear ratio of planetary gear mechanism 20. "Te" represents a torque of engine 13, and "Tg" represents a torque of first MG 14. "Tep" represents a direct torque of engine 13, and "Tm1" represents a torque obtained by converting torque Tm of second MG 15 on the output element. The sum of Tep and Tm1 corresponds to a torque output to a drive shaft (countershaft 25). The up arrow represents a positive-going torque, a down arrow represents a negative-going torque, and an arrow length represents torque magnitude.

Referring to FIGS. 5 and 6, the dotted line in FIG. 6 represents the relationship before engine speed Ne is increased, and corresponds to the line shown in FIG. 5. The relationship between torque Te of engine 13 and torque Tg of first MG 14 is uniquely determined by the gear ratio of planetary gear mechanism 20. Thus, first MG 14 can be controlled such that the rotation speed of first MG 14 increases with torque Tg of first MG 14 maintained, thereby increasing engine speed Ne of engine 13 with the driving torque maintained.

Also, referring to FIGS. 5 and 7, engine 13 can be controlled such that the output (power) of engine 13 is increased, thereby increasing torque Te of engine 13. At this time, torque Tg of first MG 14 can be increased such that the rotation speed of first MG 14 does not increase, thereby increasing torque Te of engine 13 with engine speed Ne of engine 13 maintained. Since engine direct torque Tep increases along with an increase in torque Te, second MG 15 can be controlled such that torque Tm1 decreases, thereby maintaining the torque of the drive shaft.

When torque Te of engine 13 is increased, torque Tg of first MG 14 increases, leading to an increase in the power generated by first MG 14. At this time, if charging of battery 18 is not restricted, battery 18 can be charged with the generated power which has been increased.

Although not particularly shown, controlling engine 13 can be controlled such that the output (power) of engine 13 decreases, thereby reducing torque Te of engine 13. At this time, torque Tg of first MG 14 can be reduced such that the rotation speed of first MG 14 does not decrease, thereby reducing torque Te of engine 13 with engine speed Ne of engine 13 maintained. In this case, torque Tg of first MG 14 decreases, leading to a decrease in the power generated by first MG 14. At this time, if discharging of battery 18 is not restricted, discharging by battery 18 can be increased to compensate for an amount of the decrease in the power generated by first MG 14.

Referring to FIG. 4 again, a line L3 represents a recommended operation line of engine 13. In other words, engine 13 is usually controlled to move on the recommended operation line (line L3) in which the operating point determined by torque Te and engine speed Ne is set in advance.

Figure 8:
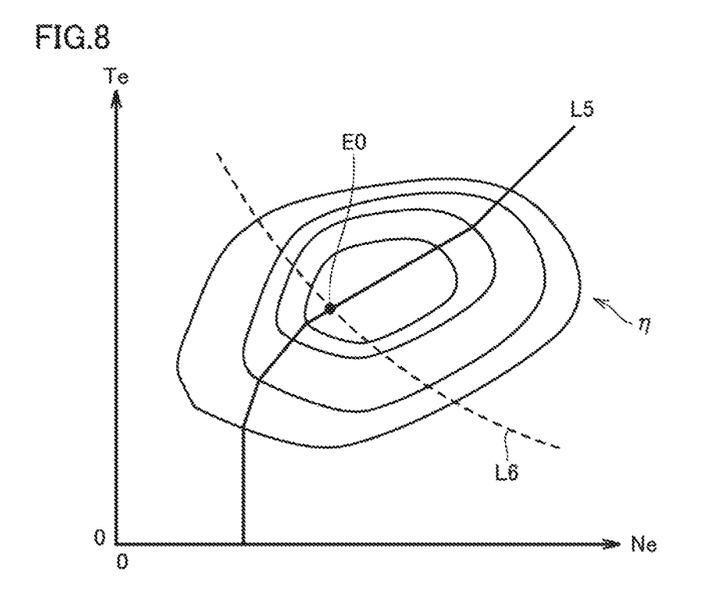
FIG. 8 shows an optimum fuel efficiency line which is an exemplary recommended operation line for the engine.

FIG. 8 shows an optimum fuel efficiency line which is an example recommended operation line of engine 13. Referring to FIG. 8, a line L5 is an operation line set in advance by initial assessment test or simulation to obtain minimum fuel consumption of engine 13. The operating point of engine 13 is controlled to be located on line L5, leading to optimum (minimum) fuel consumption of engine 13 for the requested power. A dotted line L6 is an isopower line of engine 13 which corresponds to the requested power. Note that in FIG. 4, a dotted line L41 represents an isopower line. Fuel consumption of engine 13 is optimized (minimized) by controlling engine 13 such that the operating point of engine 13 is a point at intersection E0 of dotted line L6 with line L5. A group of closed curves η in the figure shows an isoefficiency line of engine 13, in which the efficiency of engine 13 is higher as closer to the center.

<Description of Basic Computation Process of Operating Point>

Figure 9:
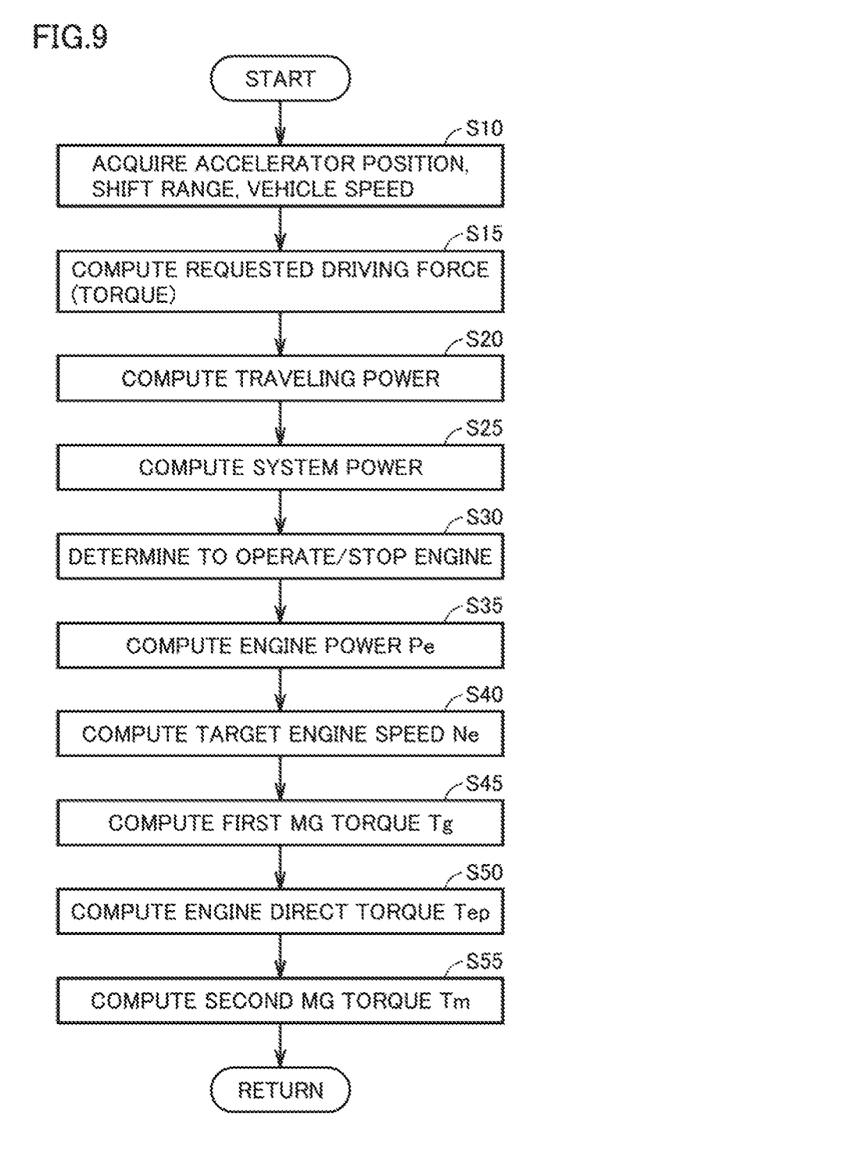
FIG. 9 is a flowchart of an example of a basic computation process for determining operating points for the engine, the first MG, and the second MG.

FIG. 9 is a flowchart showing an example basic computation process for determining the operating points of engine 13, first MG 14, and second MG 15. A series of steps shown in this flowchart is repeatedly performed for each prescribed period in HV-ECU 62.

Referring to FIG. 9, HV-ECU 62 acquires information on, for example, an accelerator position, a shift range being selected, and a vehicle speed (step S10). The accelerator position is detected by accelerator position sensor 67, and the vehicle speed is detected by vehicle speed sensor 66. The rotation speed of a drive shaft or propeller shaft may be used in place of the vehicle speed.

HV-ECU 62 then computes a requested driving force (torque) from the information acquired at step S10 using a drive force map prepared in advance per shift range, which indicates the relationship among requested driving force, accelerator position, and vehicle speed (step S15). HV-ECU 62 then multiplies the computed requested driving force by the vehicle speed and adds prescribed loss power to a result of the multiplication, thereby computing traveling power of the vehicle (step S20).

Then, when there is a charge/discharge request (power) of battery 18, HV-ECU 62 computes a value obtained by adding the charge/discharge request (charge has a positive value) to the computed traveling power as system power (step S25). For example, the charge/discharge request can have a greater positive value as the SOC of battery 18 is lower and have a negative value when the SOC is high.

HV-ECU 62 then determines to operate/stop engine 13 in accordance with the computed system power and traveling power (step S30). For example, when system power is greater than a first threshold or when traveling power is greater than a second threshold, HV-ECU 62 determines to operate engine 13.

Then, when determining to operate engine 13, HV-ECU 62 performs the process of step S35 and the following processes (HV traveling mode). Although not specifically shown, when determining to stop engine 13 (EV traveling mode), HV-ECU 62 computes torque Tm of second MG 15 based on the requested driving force.

During operation of engine 13 (during the HV traveling mode), HV-ECU 62 computes power Pe of engine 13 from the system power computed at step S25 (step S35). Power Pe is computed by, for example, making various corrections to or imposing limitations on system power. The computed power Pe of engine 13 is output to engine ECU 64 as a power command of engine 13.

HV-ECU 62 then computes an engine speed Ne (target engine rotation speed) of engine 13 (step S40). In the present embodiment, engine speed Ne is computed such that the operating point of engine 13 is located on line L3 (recommended operation line) shown in, for example, FIG. 4. Specifically, the relationship between power Pe and engine speed Ne in which the operating point of engine 13 is located on line L3 (recommended operation line) is prepared as a map or the like in advance, and engine speed Ne is computed from power Pe computed at step S35 using the map. When engine speed Ne is determined, torque Te (target engine torque) of engine 13 is also determined. Consequently, the operating point of engine 13 is determined.

HV-ECU 62 then computes torque Tg of first MG 14 (step S45). Torque Te of engine 13 can be estimated from engine speed Ne of engine 13, and the relationship between torque Te and torque Tg is uniquely determined in accordance with the gear ratio of planetary gear mechanism 20, and thus, torque Tg can be computed from engine speed Ne. The computed torque Tg is output to MG-ECU 63 as a torque command of first MG 14.

HV-ECU 62 further computes engine direct torque Tep (step S50). Since the relationship between engine direct torque Tep and torque Te (or torque Tg) is uniquely determined in accordance with the gear ratio of planetary gear mechanism 20, engine direct torque Tep can be computed from the computed torque Te or torque Tg.

HV-ECU 62 finally computes torque Tm of second MG 15 (step S50). Torque Tm is determined such that the requested driving force (torque) computed at step S15 can be obtained, and can be computed by subtracting engine direct torque Tep from the requested driving force converted on the output shaft. The computed torque Tm is output to MG-ECU 63 as the torque command of second MG 15.

As described above, the operating point of engine 13 and the operating points of first MG 14 and second MG 15 are computed.

<Control According to Allowable Value Wout for Power Discharged from Battery 18>

In hybrid vehicle 10 disclosed herein, a delay of a response of torque generated by engine 13 due to a delay of a response of boost pressure of turbocharger 47 can be compensated for by torque generated by first MG 14 or second MG 15. However, when the allowable value Wout of the power discharged from battery 18 is limited to a small value, first MG 14 or second MG 15, which is driven by the power of battery 18, may not be able to generate sufficient torque to compensate for the delay of the response of the torque generated by engine 13.

Accordingly, HV-ECU 62 according to the present disclosure controls engine 13 and first MG 14 so that when the allowable value Wout of power output from battery 18 is small, the operating point exceeds the boost line L2 at a higher rotation speed than when the allowable value Wout is large. Turbocharger 47 boosts suctioned air when the torque generated by engine 13 indicated by an operating point on the map shown in FIG. 4 representing a relationship between the rotation speed of engine 13 and the torque generated thereby exceeds the boost line L2. Vehicle 10 including engine 13 equipped with turbocharger 47 can thus reduce a delay of a response of torque generated when the allowable value Wout of power output from battery 18 is limited to a small value.

Figure 10:
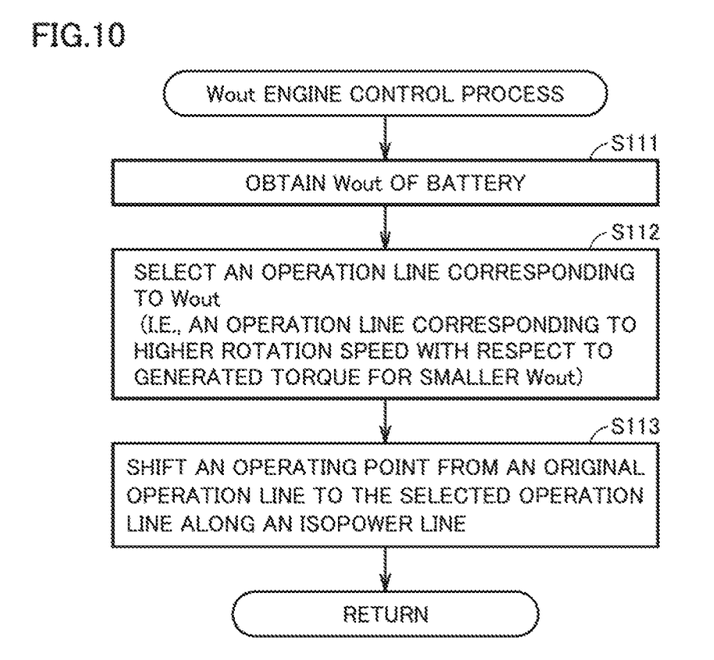
FIG. 10 is a flowchart of a Wout engine control process according to the present embodiment.

Hereinafter, control according to the present embodiment will be described. FIG. 10 is a flowchart of a Wout engine control process according to the present embodiment. This Wout engine control process is invoked and performed by a CPU of HV-ECU 62 from a higher-level process periodically as prescribed for control.

Referring to FIG. 10, HV-ECU 62 obtains Wout of battery 18 (step S111). Wout of battery 18 is stored in a storage device of HV-ECU 62 and updated depending on battery 18's SOC, temperature, cumulative time of high-rate charging and discharging, and/or the like. For example, when battery 18 has a low SOC, Wout is set lower than when the battery has a high SOC. When battery 18 has a low temperature, Wout is set lower than when the battery has a high temperature. Wout is set lower for a longer cumulative time of high-rate charging and discharging of battery 18 than for a shorter cumulative time thereof.

Then, HV-ECU62 selects an operation line (see FIG. 4, and FIG. 11, which will be referred to hereinafter) corresponding to the Wout obtained (step S112). In the present embodiment, as shown in FIG. 11, an operation line corresponding to Wout is previously determined.

Figure 11:
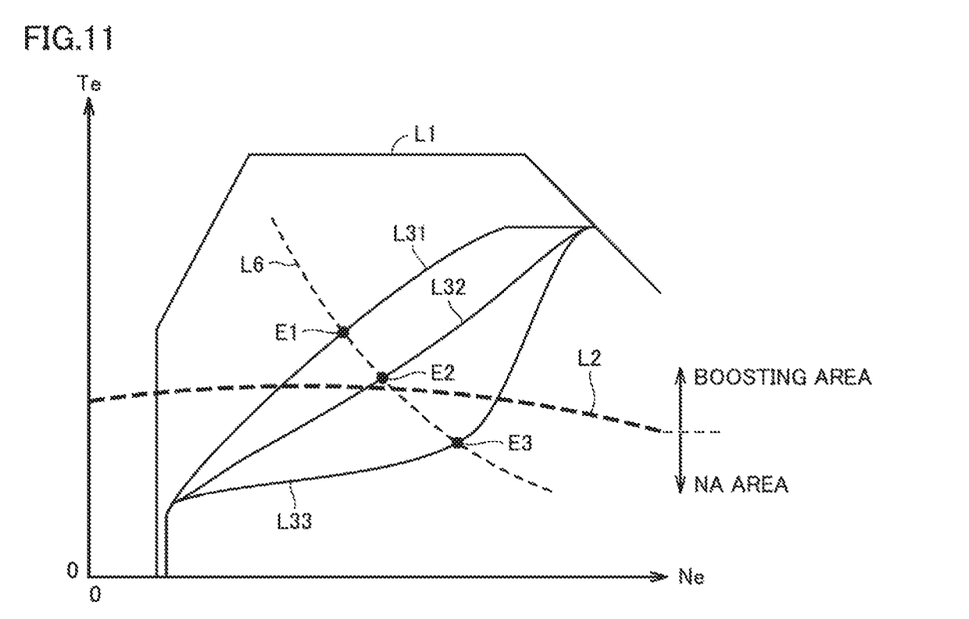
FIG. 11 is a diagram for illustrating how an operating point is shifted by control according to the present embodiment.

FIG. 11 is a diagram for illustrating how an operating point is shifted by control according to the present embodiment. Referring to FIG. 11, an operation line L31 is associated when Wout has a relatively large value (for example, Wout≥Wout1). An operation line L33 is associated when Wout has a relatively small value (for example, Wout<Wout2 (<Wout1)). An operation line L32 is associated when Wout has a medium value between Wout with which the operation line L31 is associated and Wout with which the operation line L33 is associated (for example, Wout2<Wout<Wout1). These correspondences are previously stored in the storage device of HV-ECU 62.

Returning to FIG. 10, HV-ECU 62 shifts an operating point from an original operation line to the operation line that is selected in step S112 along an isopower line (for example, an isopower line L6 shown in FIG. 11) (Step S113). Thereafter, HV-ECU 62 returns to the higher-level process from which the Wout engine control process is invoked.

Referring again to FIG. 11, for example, when Wout is Wout2<Wout<Wout1, the operation line L32 is selected, and when the original operation line is the operation line L31, an operating point E1 on the operation line L31 is shifted to an operating point E2 on the selected operation line L32 along the isopower line L6. Note that, although not shown in FIG. 11, there are a plurality of isopower lines in parallel with the isopower line L6, depending on output of engine 13.

Furthermore, when Wout is Wout<Wout2, the operation line L33 is selected, and when the original operation line is the operation line L32, the operating point E2 on the operation line L32 is shifted to an operating point E3 on the selected operation line L33 along the isopower line L6.

For example, when control is applied to perform a steady operation at the operating point E2, and Wout is decreased from Wout2 or more to less than Wout2, control is applied to shift the operating point to the operating point E3 and perform a steady operation at the operating point E3. Furthermore, when control is applied to move an operating point upward along the operation line L32, and Wout is decreased from Wout 2 or more to less than Wout2, then, as well as the operating point E2 being shifted to the operating point E3, control is applied to allow an operating point at a different time point to be also shifted along an isopower line so that the operating point moves upward along the operation line L33.

Thus, when Wout is small, an operating point is moved along an operation line represented on the FIG. 11 map corresponding to higher rotation speed with respect to torque generated than when Wout is large, so that when Wout is small, the operating point exceeds the boost line L2 at higher rotation speed than when Wout is large, which can increase exhaust gas energy supplied to turbocharger 47 when boosting suctioned air is started. This can reduce a delay of a response of boost pressure by turbocharger 47. As a result, when the allowable value Wout of power output from battery 18 is limited to a small value and torque supplemented by the first MG is decreased, a delay of a response of torque generated by engine 13, and hence a delay of a response of torque generated by engine 13 and first MG 14 together can be reduced.

In contrast, for example when Wout is Wout2≤Wout<Wout1, the operation line L32 is selected, and when the original operation line is the operation line L33, the operating point E3 on the operation line L33 is shifted to the operating point E2 on the selected operation line L32 along the isopower line L6.

Furthermore, when Wout is Wout≥Wout1, the operation line L31 is selected, and when the original operation line is the operation line L32, the operating point E2 on the operation line L32 is shifted to operating point E1 on the selected operation line L31 along the isopower line L6.

For example, when control is applied to perform a steady operation at the operating point E2, and Wout is increased from less than Wout1 to Wout1 or more, control is applied to shift the operating point to the operating point E1 and perform a steady operation at the operating point E1. Furthermore, when control is applied to move an operating point upward along the operation line L32, and Wout is increased from less than Wout1 to Wout1 or more, then, as well as the operating point E2 being shifted to the operating point E1, control is applied to allow an operating point at a different time point to be also shifted along an isopower line so that the operating point moves upward along the operation line L31.

Thus, when Wout is large, an operating point is moved along an operation line shown on the FIG. 11 map corresponding to lower rotation speed with respect to torque generated than when Wout is small, so that when Wout is large, the operating point exceeds the boost line L2 at lower rotation speed than when Wout is small, and the operating point can be moved on an operation line closer to the optimum fuel efficiency line shown in FIG. 8. As a result, fuel efficiency can be improved when the allowable value Wout of power output from battery 18 is not limited to a small value.

<Modification>

(1) In the above-described embodiment, as shown in step S112 of FIG. 10, an operation line corresponding to Wout is selected from the three operation lines shown in FIG. 11. However, this is not exclusive, and the operation line corresponding to Wout may be selected from a plurality of operation lines other than the three operation lines. Even in that case, when Wout is small, an operation line corresponding to higher rotation speed with respect to torque generated, as represented on the FIG. 4 or 11 map, than when Wout is large, is selected.

(2) The above-described embodiment can be regarded as disclosure of a hybrid vehicle such as vehicle 10. Further, the above-described embodiment can be regarded as disclosure of a controller, such as HV-ECU 62, for a hybrid vehicle. Further, the above-described embodiment can be regarded as disclosure of a control method in which the controller performs the process shown in FIG. 10. Further, the above-described embodiment can be regarded as disclosure of a program of the Wout engine control process shown in FIG. 10 and performed by the controller.

<Effect>

(1) As shown in FIGS. 1 to 3, vehicle 10 includes engine 13, first MG 14, planetary gear mechanism 20 to which engine 13, first MG 14, and counter shaft 25 are connected, battery 18 that stores power generated by first MG 14 and supplies the stored power to first MG 14, and HV-ECU 62 configured to control engine 13 and first MG 14. As shown in FIGS. 1 and 2, engine 13 includes turbocharger 47 that boosts suctioned air to be fed to engine 13. As shown in FIG. 4, the boost line L2 determined on a map representing a relationship between the rotation speed of engine 13 and the torque generated thereby is such that turbocharger 47 boosts suctioned air when the torque generated by engine 13 indicated by an operating point on the map exceeds the boost line L2.

As shown in FIGS. 10 and 11, HV-ECU 62 controls engine 13 and first MG 14 so that when the allowable value Wout of power output from battery 18 is small, the operating point exceeds the boost line L2 at a higher rotation speed than when the allowable value Wout is large.

Thus, when the allowable value Wout of power output from battery 18 is small, the operating point exceeds the boost line L2 at higher rotation speed than when the allowable value Wout is large, which can increase exhaust gas energy supplied to turbocharger 47 when boosting suctioned air is started. This can reduce a delay of a response of boost pressure by turbocharger 47. As a result, in vehicle 10 including engine 13 with turbocharger 47, when the allowable value Wout of power output from battery 18 is limited to a small value and torque supplemented by first MG 14 is decreased, a delay of a response of torque generated by engine 13, and hence a delay of a response of torque generated by engine 13 and first MG 14 together can be reduced.

(2) As shown in FIGS. 10 and 11, HV-ECU 62 controls engine 13 and first MG 14 so that when the allowable value Wout of power output from battery 18 is small, the operating point moves along any one of the operation lines L31 to L33 corresponding to higher rotation speed with respect to torque generated, as represented on the maps shown in FIGS. 4 and 11, than when the allowable value Wout is large.

Vehicle 10 including engine 13 equipped with turbocharger 47 can thus reduce a delay of a response of torque generated when the allowable value Wout of power output from battery 18 is limited to a small value.

(3) As shown in FIG. 11, the operation lines L31 to L33 corresponding to the allowable value Wout are previously determined.

This allows more efficient control than when the operation lines L31 to L33 corresponding to the allowable value Wout are not previously determined.

(4) As shown in FIG. 10, HV-ECU 62 increases the rotation speed of engine 13 by controlling the rotation speed of first MG 14 to increase it. This can increase the rotation speed of engine 13 with precision.

Although the embodiments of the present invention have been described, it should be considered that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A hybrid vehicle comprising:
an internal combustion engine;
a rotating electric machine;
a planetary gear mechanism to which the internal combustion engine, the rotating electric machine and an output shaft are connected;
a power storage device that stores power generated by the rotating electric machine and supplies the stored power to the rotating electric machine; and
a controller that controls the internal combustion engine and the rotating electric machine, wherein
the internal combustion engine includes a forced induction device that boosts suctioned air to be fed to the internal combustion engine,
a boost line is determined on a map representing a relationship between a rotation speed of the internal combustion engine and torque generated by the internal combustion engine, and the forced induction device boosts suctioned air when the torque generated by the internal combustion engine indicated by an operating point on the map exceeds the boost line, and
the controller controls the internal combustion engine and the rotating electric machine so that when an allowable value of power output from the power storage device is small, the operating point exceeds the boost line at a higher rotation speed than when the allowable value is large.

2. The hybrid vehicle according to claim 1, wherein the controller controls the internal combustion engine and the rotating electric machine so that when the allowable value of power output from the power storage device is small, the operating point moves along an operation line corresponding to a higher rotation speed with respect to torque generated, as represented on the map, than when the allowable value is large.

3. The hybrid vehicle according to claim 2, wherein an operation line corresponding to the allowable value is predetermined.

4. The hybrid vehicle according to claim 1, wherein the controller increases the rotation speed of the internal combustion engine by controlling the rotating electric machine to increase a rotation speed of the rotating electric machine.

5. The hybrid vehicle according to claim 2, wherein, when the operating point moves, the operating point moves along an isopower line.

* * * * *